(12) United States Patent
Scherer et al.

(10) Patent No.: US 9,676,374 B2
(45) Date of Patent: Jun. 13, 2017

(54) LOCKING UNIT

(71) Applicant: SVM Schultz Verwaltungs-GmbH & Co. KG, Memmingen (DE)

(72) Inventors: Georg Scherer, Kirchheim (DE); Helmut Mang, Memmingen (DE)

(73) Assignee: SVM Schultz Verwaltungs-GmbH & Co. KG, Memmingen (DE)

( * ) Notice: Subject to any disclaimer, the term of this patent is extended or adjusted under 35 U.S.C. 154(b) by 351 days.

(21) Appl. No.: 13/784,685

(22) Filed: Mar. 4, 2013

(65) Prior Publication Data

US 2013/0228412 A1 Sep. 5, 2013

(30) Foreign Application Priority Data

Mar. 5, 2012 (DE) .................. 10 2012 004 157

(51) Int. Cl.
*B60T 1/00* (2006.01)
*F16H 63/34* (2006.01)
*F15B 15/26* (2006.01)

(52) U.S. Cl.
CPC ............ *B60T 1/005* (2013.01); *F15B 15/261* (2013.01); *F16H 63/3433* (2013.01); *F16H 63/3475* (2013.01); *F16H 63/3483* (2013.01)

(58) Field of Classification Search
CPC .............................. F16H 63/3433; F16H 63/48
See application file for complete search history.

(56) References Cited

U.S. PATENT DOCUMENTS

| | | | | |
|---|---|---|---|---|
| 4,253,689 A * | 3/1981 | McKee | ........................... | 292/338 |
| 4,969,346 A * | 11/1990 | Bosl | ........................ | B21D 5/08 |
| | | | | 72/177 |
| 6,175,291 B1 * | 1/2001 | Kleinert | ................... | H01F 7/081 |
| | | | | 335/251 |
| 7,650,978 B2 * | 1/2010 | Ruhringer | ............. | F15B 15/261 |
| | | | | 188/265 |
| 7,866,763 B2 * | 1/2011 | Inagaki | ................... | B60T 7/047 |
| | | | | 188/106 F |
| 2004/0011609 A1 * | 1/2004 | Schmid | ................... | B60T 1/005 |
| | | | | 188/265 |
| 2008/0236967 A1 * | 10/2008 | Mayr | .................... | F15B 15/261 |
| | | | | 188/300 |
| 2009/0255393 A1 * | 10/2009 | Seigneur | ................ | B27B 33/14 |
| | | | | 83/830 |

FOREIGN PATENT DOCUMENTS

| | | |
|---|---|---|
| CN | 101297135 A | 10/2008 |
| DE | 10347667 A1 | 4/2004 |
| DE | 102004030007 A1 | 3/2006 |
| DE | 102005001548 A1 | 7/2006 |
| DE | 102005060583 A1 | 6/2007 |
| DE | 102007000637 A1 * | 5/2008 |
| DE | 102010041835 A1 | 8/2011 |

* cited by examiner

*Primary Examiner* — Logan Kraft
(74) *Attorney, Agent, or Firm* — Loginov & Associates; William A. Loginov

(57) ABSTRACT

The invention refers to a locking unit for locking the movement of a piston drivable by a drive. The locking unit comprises a solenoid and a catch assembly. The catch assembly has a spring section and a latch section, wherein the elastic spring section angles the catch assembly against an armature rod. In a locking position, the latch section blocks the movement of the piston. In an unlocking position, the movement of the piston is released. The latch section is equipped at least with a reinforcement acting in the direction of movement of the piston.

18 Claims, 5 Drawing Sheets

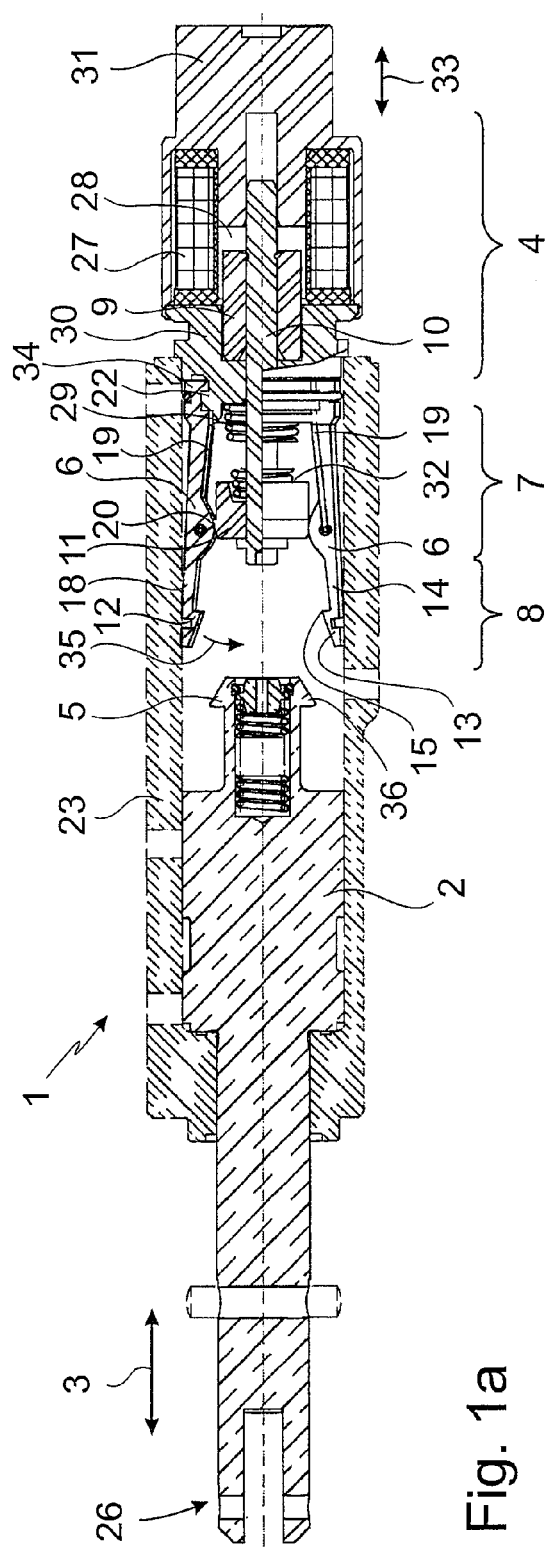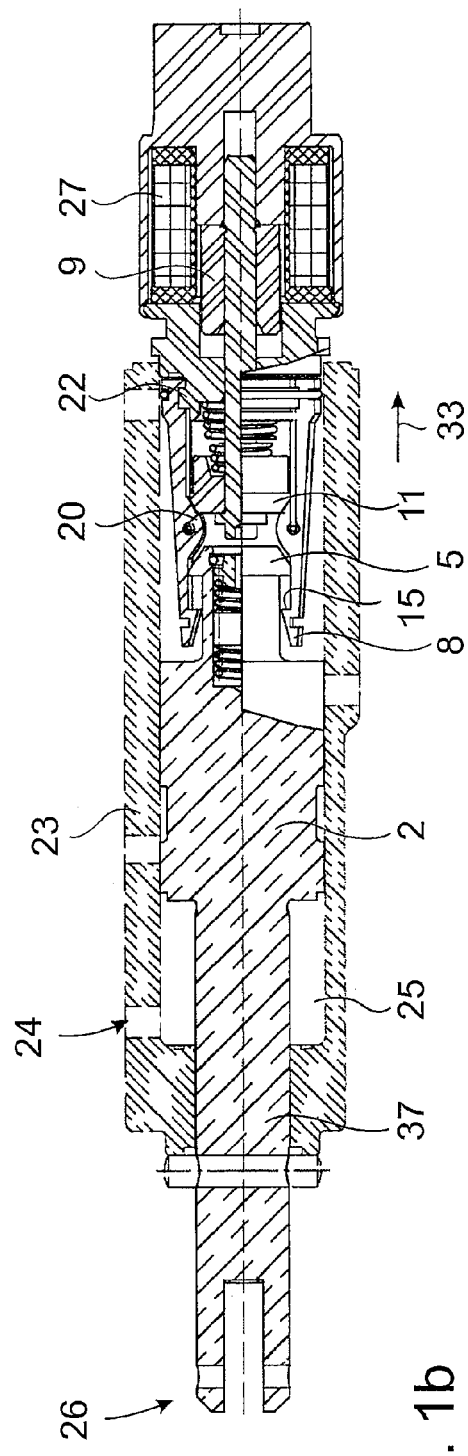
Fig. 1a
Fig. 1b

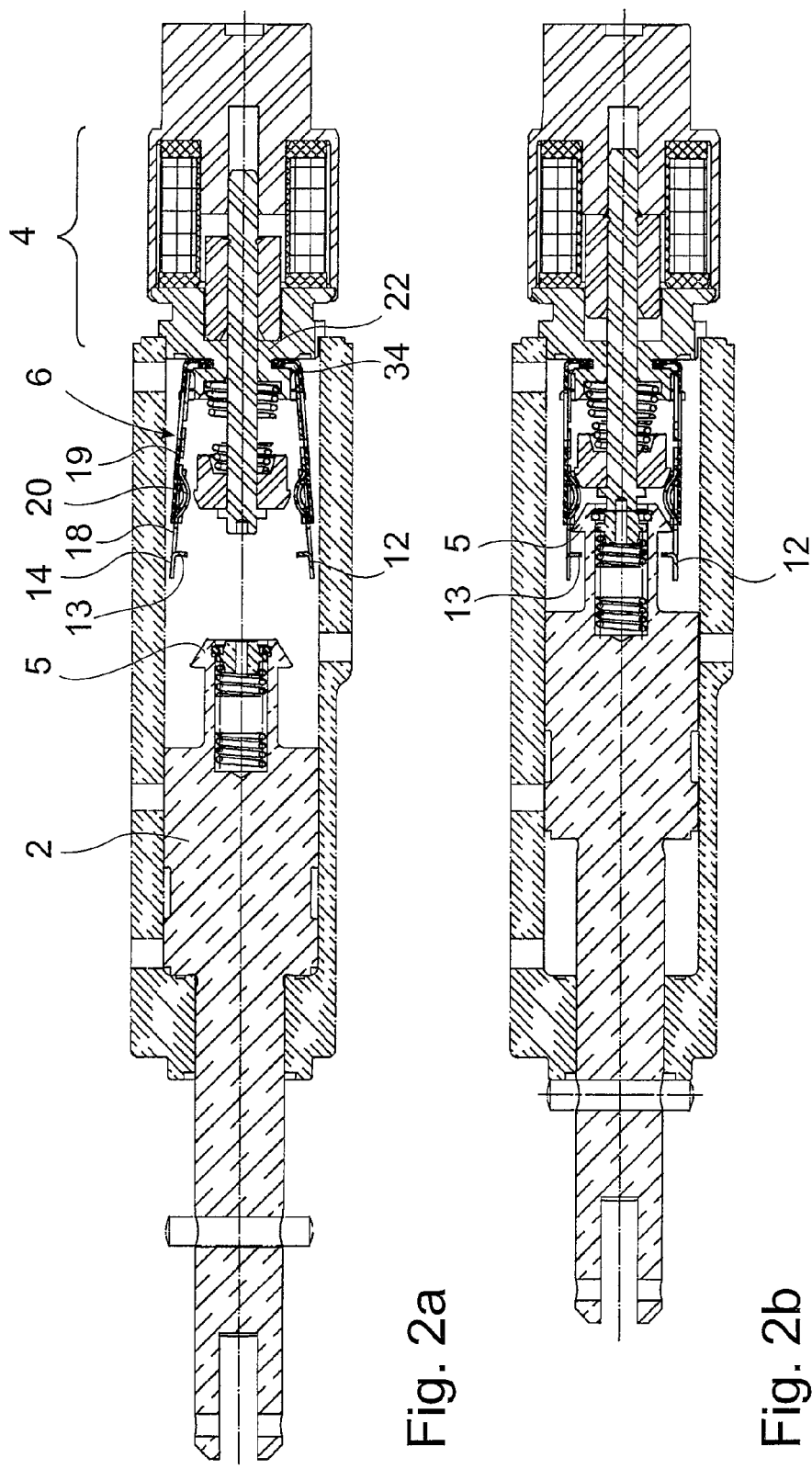

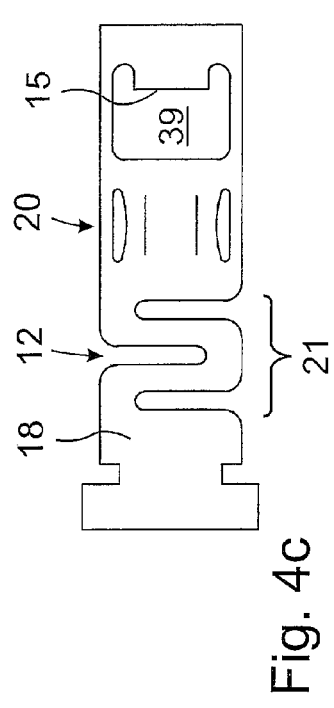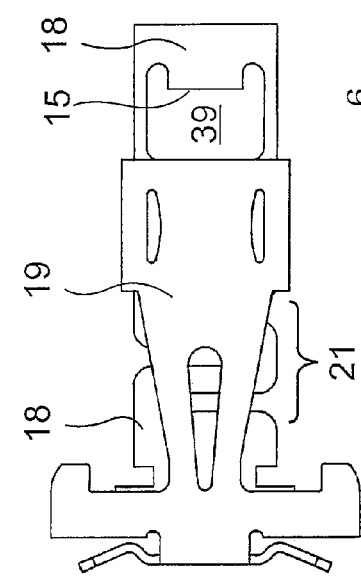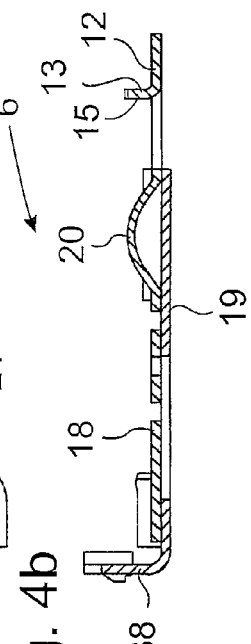
Fig. 3c
Fig. 3b
Fig. 3a
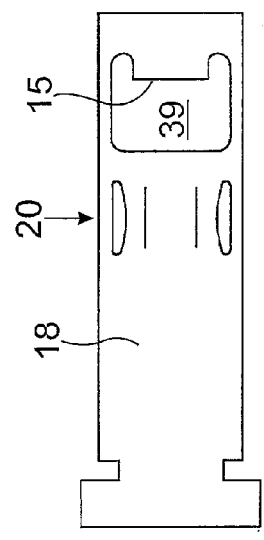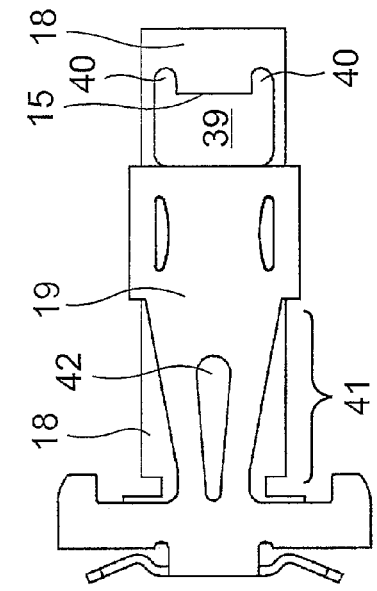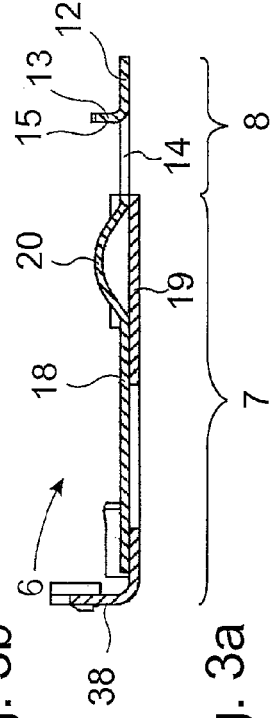
Fig. 4c
Fig. 4b
Fig. 4a

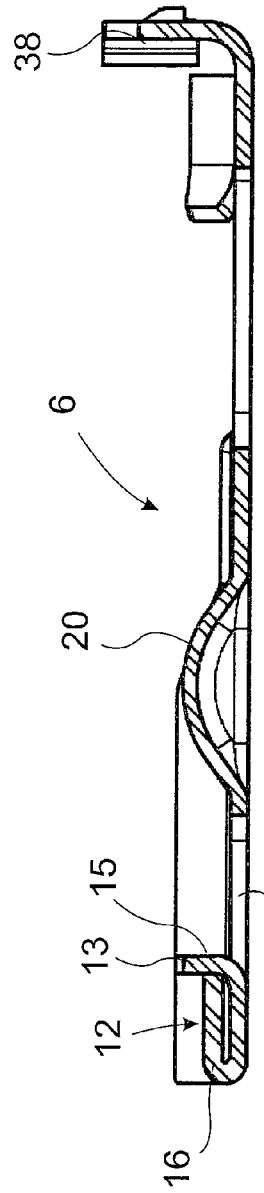
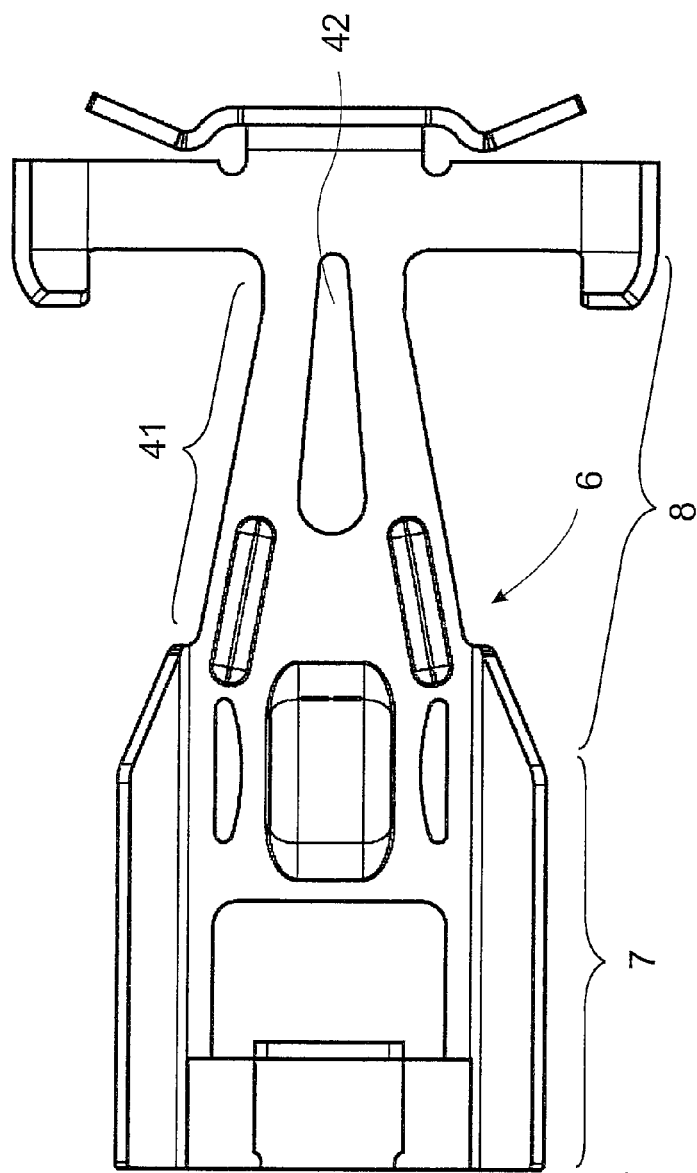

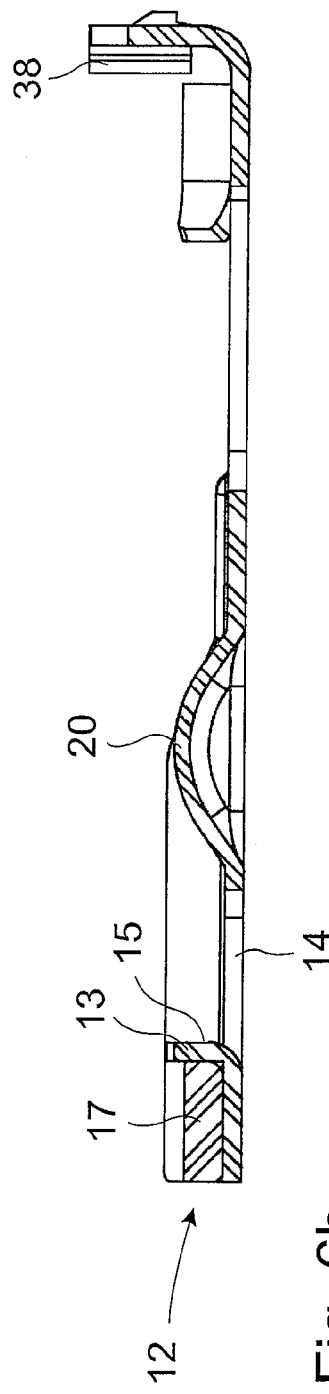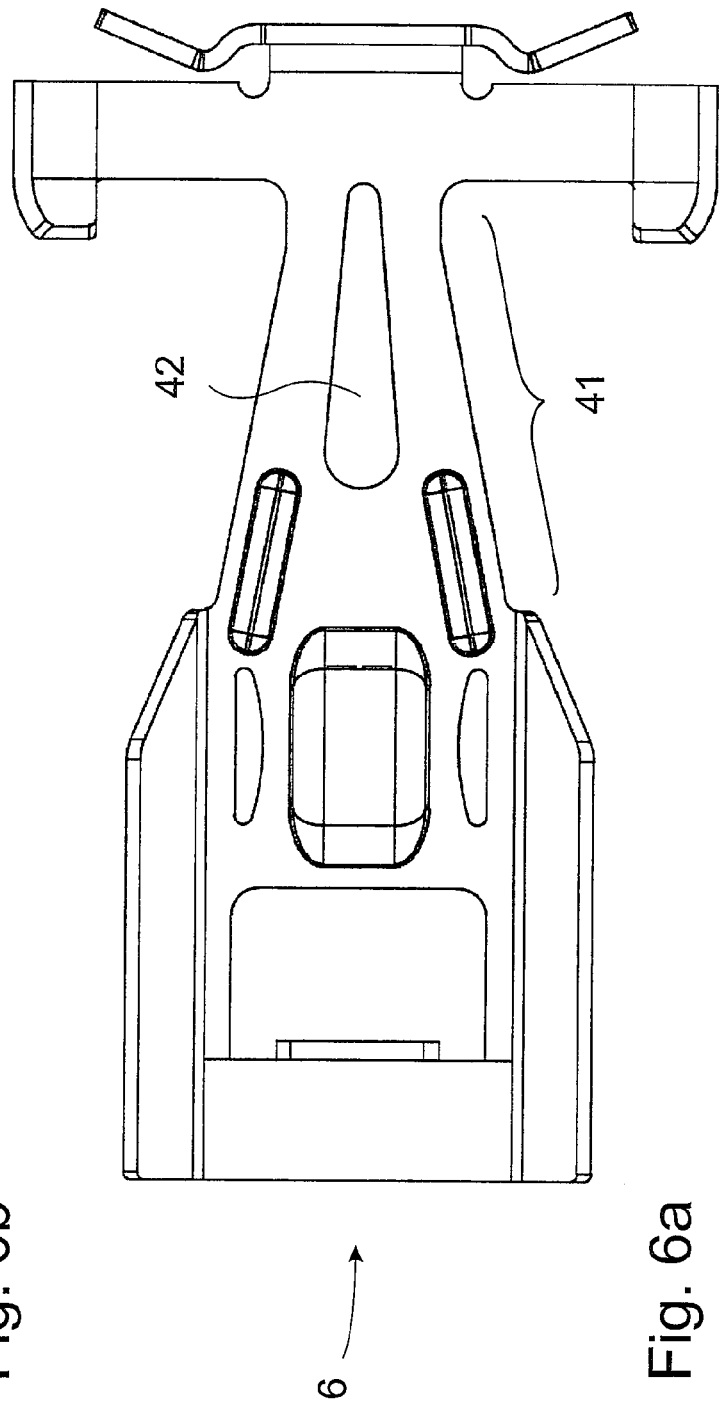

LOCKING UNIT

RELATED APPLICATIONS

Background of the Invention

The invention refers to a locking unit for locking the movement of a piston drivable by a drive, wherein the locking unit comprises a solenoid and a catch assembly with a spring section and a latch section, wherein the elastic spring section angles the catch assembly against the armature or the armature rod of the solenoid, or against a bolt held by the armature or the armature rod such that in a locking position the latch section blocks the movement of the piston, wherein in an unlocking position the movement of the piston is released.

Afore mentioned locking units are used in particular in the parking lock of automatic gearboxes. Herein the pressure potential of the hydraulic loop of the automatic gear is used as drive for a movable piston.

Besides configuring the drive of the movable piston as part of a working cylinder, that is as a pressurized piston, it is also possible to provide, for example, an electromotor and another, for example, electro-magnetically or electrically working drive as drive. The invention is not limited to the particular design of the drive.

A vehicle with manual gear shifting can be secured against unintended movement by engaging a gear, when standing with motor off. However, this is not possible with automatic gears as, when the motor is turned off, there is no frictional connection with the driven wheels. Therefore, automatic gearboxes have a mechanic locking of the gear output shaft that has to be activated that means set in the parking position, and thus prevents the vehicle from rolling away.

The locking unit herein interacts with the hydraulic cycle of the automatic gearbox. When the parking lock is set, as a rule, it is provided herein that the piston is unlocked. Usually, the piston rod of the piston herein acts with a blocking element in a suitable way on the drive train. In the driving position, that is when the parking lock is turned off, the moving, in particular pressurized piston is locked.

A locking unit of this kind can be seen, for example, in the European patent specification 1 408 260.

The catch assembly, known in the prior art as component having one piece or one part configuration in, fulfills herein at least two functions. The latch section of the catch assembly interacts with the piston to block the movement of the piston in the locking position. The latch section of the catch assembly is herein characterized in that it is the local area at the catch assembly that is associated with the piston or interacts with the piston. The latch section herein not only a hook, latch, protrusion or shoulder interacting in a suitable way with the piston, but also other sections. Usually, just the latch section is appropriately mechanically tensile-loaded or impact-stressed in the direction of movement of the piston.

Joined to the latch section or even partly overlapping the latch section, a spring section is also provided at the catch assembly. The spring section has an appropriate elastic design to accomplish that the catch assembly is angled radially or angularly with reference to the direction of movement of the piston against the armature or the armature rod of the solenoid, or against a bolt held by the armature or the armature rod. Here at the catch assembly, a cam or another guiding element is provided interacting in a suitable way with the armature, the armature rod or the bolt, and can be deflected by the motion of the armature (when the solenoid is electrified) in angular or rectangular or radial direction with reference to the direction of movement of the piston.

The arrangement is herein chosen such that in a locking position the latch section blocks the movement of the piston. The elastic configuration of the spring section moves or swivels the catch assembly at least partly such that the latch section can interact with the piston or the piston head having a corresponding undercut, catch or the like, and thus the movement of the piston is blocked. The locking position corresponds here with the attracted solenoid, this is the electrified solenoid, so that the bolt arranged on the armature rod or the armature does not interact with the cam provided on the catch assembly that angles in current-dropped (solenoid is not electrified) unlocking position the catch assembly outward in such a way that the latch section cannot interact anymore with the piston head.

Therefore, it is clear that the catch assembly is exposed to an appropriate mechanic load caused by different reasons.

BRIEF SUMMARY OF THE INVENTION

It is an object of the current invention to provide a locking unit having a longer lifetime.

In order to solve this problem the invention refers to a locking unit as described before, and suggests that the latch section has a reinforcement working at least in the direction of movement of the piston.

Strengthening at least the latch section by a reinforcement working at least in the direction of movement of the piston accomplishes that a risk of fracture of the catch assembly just in the heavily mechanically loaded latch section is considerably reduced.

The result is herein an appropriate, partly considerable increase of the lifetime of the invention locking unit.

A preferred embodiment of the invention provides that the reinforcement is formed by an increase of the specific strength of the material of the latch section caused by heat treatment. Generally, it is known to temper metal by heat treatment such that it afterwards has higher specific strength than it was before.

The heat treatment is restricted herein preferably to the latch section in order to provide it only in this section where the higher strength is decisive. However, surprisingly, it is not a disadvantage for the invention when the entire catch assembly, that is also the spring section, is exposed to the same or a similar heat treatment, so that the corresponding process step can be performed considerably easier. It has been found that the increase of strength resulting from the heat treatment, that leads also to more brittle material, is no disadvantage in the spring section. Usually, it could be expected that the heat treatment is damaging exactly for the spring section, and the result is then a decrease of the qualities (for example, faster fracture of the catch assembly in the spring section because of the more brittle material), which is, however, just not the case here.

In a preferred embodiment of the invention it has been found that the result of the heat treatment, that follows preferably a forming step during the manufacture of the catch assembly, is a relative increase of strength by at least 4%, preferably at least 5%. Thus, it has been accomplishes for example in an embodiment that in unhardened condition, the material of the latch section (or of the entire catch assembly) had a hardness of 324 HV (hardness according to Vickers), that has risen after the heat treatment to about 345 HV. This rather small increase of the hardness leads to an improvement of the tensile strength exactly in the latch section. The result is herein a considerable higher, about at least 4 times higher lifetime of the locking unit according to the invention.

The suggestion according to the invention of increasing the strength of the material of the latch section by a heat treatment at least of the latch section does not lead to the disadvantages that could actually be expected with respect to the springy or elastic quality of the catch assembly or the spring section, but it increases the lifetime of the entire locking unit according to the invention considerably!

A preferred embodiment of the invention provides for the entire catch assembly, however, at least the latch section, being formed of spring steel that can be durably formed, at least when cold. The locking unit according to the invention is manufactured in very large quantities. A locking unit usually has more than only one catch assembly, for example, often more than three catch assemblies are built in one locking unit. Because of the mass production, of course, also an economic manufacture is decisive that is accomplished by use of forming and/or bending and/or punching tools as efficiently as possible which perform preferably in one machining or forming step all required operations at the catch assembly, in particular in the latch section and so on. Herein, of course, also the material of the catch assembly, at least of the latch section, has to be chosen such that, on the one hand, a permanent forming of the material is possible, on the other hand, however, the resilient quality of the catch assembly, that is provided in particular by the spring section, is also secured. Therefore, it is decisive when realizing the invention, that in particular the material of the catch assembly or at least the material of the latch section is chosen cleverly, that is formed of cold forming, however durably stable in form, spring steel, the invention suggesting here for example (but not exclusively) nickel-chromium steel.

The material (for example steel) is provided here, for example, as strip stock and forming punched out of the material in a continuous process.

Manufacturing of the preferably one-piece catch assembly, or at least the latch part, when the design of the catch assembly is multi-piece, is performed here in several steps. The forming step combining punching, that is material removing steps, with forming, that is bending or deep-drawing process steps, is followed by a heat treatment step where the formed and shaped element is exposed to an increase of strength by the heat treatment.

Alternatively to the configuration of the reinforcement of the latch section by increasing the specific strength it is furthermore suggested that the reinforcement is accomplished by increasing the material thickness of the material forming the latch section. For example, so-called stepped sheet metals are known with differing material thickness and that provide a larger material thickness and thus a larger stability in the mechanically more stressed latch section. Thus, for example, the usual material thickness of the catch assembly in the latch section can be increased from 0.5 mm to 0.8 mm or 1 mm.

In another alternative configuration of the invention it is provided that the latch element has a retaining surface interacting with the piston in the locking position, and the reinforcement is located at the latch section on the side of the latch element opposite the retaining surface. The latch section is here formed at least by a latch element and a latch carrier, the latch element sticking out at the latch carrier rectangularly or angularly, in particular towards the piston. The latch element has here the function of interacting with the piston actually holding, a retaining surface being provided at the latch element for that. Cleverly, the reinforcement is arranged on the side of the latch element opposite the retaining element. This configuration effects that the reinforcement is arranged at the latch section on the perfect spot. There are several modifications for the configuration of the reinforcement in this section.

First, it is provided to configure the reinforcement as folding, in particular terminal folding of the material of the latch carrier. Such a folding can be designed along with the forming step of the catch assembly or the latch carrier in a simple manner, and leads finally, similarly to the suggestion of using a stepped sheet metal, to an appropriate doubling of the material and thus to a reinforcement.

Of course, it is possible to combine several of the measurements for reinforcing described here, for example, to impress a folding suggested according to the invention, and, after that, to improve the strength of the catch assembly or at least the latch section by a heat treatment. Such combined measurements for executing the reinforcement are also part of the invention.

The before mentioned suggestion provides in particular that the latch carrier or the catch assembly is designed in one piece by the folding and is reinforced. Alternatively, it is possible that the reinforcement is designed as separately inserted support arranged, for example, in a gluing, soldering, or welding step at the desired spot at the latch carrier or the catch assembly.

Another modification according to the invention provides a catch assembly designed in one part or configured in one piece. The catch assembly consists here of preferably homogenous material without restricting the invention to it. It is also possible to realize a one-piece or one-part configuration of the catch assembly with a heterogeneous material compound, where then cleverly the respective features of the spring section and latch section are perfected, in particular a reinforcement is provided in the latch section. The reinforcement can then be realized by specially selecting the material of the latch section or by material tempering or actually by mechanic strengthening. Usually, the term of a homogenous material comprises also materials with identical qualities, however, this can also be called heterogeneous material if its chemical properties do not change but it partly shows different properties, for example, because of a heat treatment. Also similar suggestions are comprised by the idea of the invention.

The invention comprises, besides a one-piece configuration of the catch assembly, also a suggestion where the catch assembly consists of at least two parts, that means a two-part design of the catch assembly has been chosen. The spring section is realized here at a spring part, and the latch section at a latch part, the spring part and the latch part, respectively, being manufactured as independent, separate components that are, however, after that assembled in the catch assembly and interact. Such a dissected construction of the catch assembly has the considerably advantage that the catch assembly is each time perfected with respect to its respective properties (resilient and holding), and for the respective perfection the suitable measurements can be selected independently from each other. For a stable mechanic composite then the two components are connected in a suitable way, either mechanically caulked, glued, welded, soldered, or joined by a third element.

For example, it is provided that the spring part is formed of a well resilient material, for example spring steel or a spring wire, or the spring part is formed of spring steel that can be durably formed, at least when cold. In this modification, the spring part has perfected resilient, elastic qualities.

In contrast to that, for example, the material of the latch part has a higher strength when tensile loaded than the material of the spring part, so that it complies with the increased mechanic load of the latch part, in particular in the latch section.

A preferred embodiment of the invention provides that the latch part or the catch assembly has a spring element acting as reinforcement, in particular in the direction of movement of the piston. This spring element acting in the direction of movement of the piston shows properties of a shock absorber. Therefore, it acts also as reinforcement according to the invention in order to compensate somewhat the mechanic shock acting on the latch section in the locking position, and thus to increase the lifetime of the locking unit according to the invention accordingly. It is clear that the arrangement of this spring element can be realized in the one-piece catch assembly as well as in the multi-piece catch assembly with a latch part and a spring part.

For example, the spring element is realized in sections by a meandering design of the latch section or the catch assembly, this spring element being preferably provided in the latch section or latch part, and thus not impeding the resilient, elastic function of the spring part that has acts in another direction. The invention does not exclude here an appropriate local overlapping of these two functions.

BRIEF DESCRIPTION OF SEVERAL VIEWS OF THE DRAWINGS

In the drawing the invention is shown schematically, in particular in an example. In the figures:

FIGS. 1a, 1b, 2a, 2b in cross section each time an embodiment of the invention locking unit according to the (modification 1: FIGS. 1a, 1b, modification 2: FIGS. 2a, 2b) in the unlocking position (FIGS. 1a, 2a) and the locking position (FIGS. 1b, 2b), respectively;

FIGS. 3a, 3b, 3c and FIGS. 4a, 4b, 4c, respectively show sectional (FIGS. 3a, 4a), bottom view (FIGS. 3b, 4b) as well as a detail (FIGS. 3c, 4c) of a two-piece catch assembly according to the invention in two different embodiments (modification 1: FIGS. 3a, 3b, 3c, embodiment 2: FIGS. 4a, 4b, 4c);

FIGS. 5a, 5b and FIGS. 6a, 6b, respectively show sectional (FIGS. 5b and 6b) as well as in top view (FIGS. 5a and 6a, respectively) each an embodiment of a one-piece catch assembly according to the invention, wherein FIGS. 5a, 5b show a first embodiment, and FIGS. 6a, 6b show a second embodiment.

The before described numbering of embodiments does not limit the invention, it only describes the different possible embodiments of the invention, and does not describe a uniform, restricting idea of realizing the locking unit.

DETAILED DESCRIPTION OF PREFERRED EMBODIMENTS

In the figures, identical or corresponding elements are each time indicated by the same reference numbers, and therefore are, if not useful, not described anew.

FIGS. 1a, 1b show a first embodiment of the invention locking unit 1. The locking unit 1 serves for locking the movement 3 of a piston 2 driven by a drive. The movement 3 of the piston 2 is indicated by double arrow 3. Therefore, the piston 2 is guided and supported on bearings in a housing 23. For example, a separate drive is provided for the movement 3 of the piston 2, or the piston 2 is part of a cylinder preferably acting hydraulically working (alternatively, of course, also a pneumatic working cylinder is possible) that is connected with the hydraulic cycle of an automatic gearbox. Via the joint 24, the pressure space 25 is pressurized with hydraulic pressure from of the system, so that the piston 2 movably supported on bearings is shifted to the right, as it is shown in FIG. 1b. Here, the fork-like blocking element 26 is disengaged from the corresponding parts of the transmission of the vehicle that accomplishes an additional, in particular form-fitting locking of the gear output shaft when the engine has been turned off (when the hydraulic pump has been turned off or the parking position).

In the drive position of the vehicle equipped with the locking unit 1 according to the invention, the released position of the parking lock has to be secured accordingly, that is locked, what is performed with the locking unit 1 according to the invention. The locking position of the activated locking unit is shown in FIG. 1b.

The construction of the locking unit 1 is characterized in that at its left hand end the piston 2 is arranged movably supported on bearings having a hook-like piston head 5. On the right hand side, joined to the piston 2, the catch assembly 6 is located that is provided in the housing 23 substantially stationarily (not axially, in the direction of movement 3 of the piston 2, movably altogether), however, for example, supported on bearings swiveling.

The catch assembly 6 interacts, on the one hand, with the piston head 5 or the piston 2, and, on the other hand, with the bolt 11 moved by the solenoid 4. Because of the movement of the bolt 11 the catch assembly 6 operatively engages with the piston 2.

The solenoid 4 is joined on the right hand side on the catch assembly 6, on the side opposite the piston 2.

The construction of the solenoid 4 is as usual, the solenoid 4 has a coil 27 with a multitude of windings that can be flown through by current. The flow of electricity through the windings of the coil 27 generates a magnetic field acting on the movable elements of the solenoid 4, in particular on the armature 9. Here, the coil 27 flown through by current generates a magnetic field trying to shift the armature 9 to the right in such a way that the air gap 28 closes. This is performed against the reset force of a return spring 29. The return spring 29 is located on the left hand side, outside the solenoid 4 that is limited by the yoke 30.

The armature 9 is axially guided in a corresponding bore hole of the yoke 30 and is movable. The armature 9 carries an armature rod 10 concentrically supported on bearings or arranged that is again guided on the right hand side of the air gap 28, the side opposite the yoke 30, additionally in a bore hole of the core 31. The yoke 30 has here a stepped bore hole thus serving not only for supporting the armature 9, but also for supporting the armature rod 10. In the construction chosen here the armature rod 10 transfers the movement of the armature 9 arranged movably inside the solenoid 4 to components arranged outside the solenoid 4, in particular on the left hand side of the yoke 30, such as for example to the bolt 11 arranged on the armature rod 10.

The arrangement is here chosen such that between the catch assembly 6 and the solenoid 4 the yoke 30 is arranged, and the solenoid 4 ends in the core 31 on the side opposite the yoke 30 (with respect to the axis of the coil 27), the side being in the embodiment parallel to the direction of movement 3.

It is clear that the invention is not restricted to the particular design of the solenoid 4, but the locking unit according to the invention is very variable when designing the solenoid 4, in particular in its spatial arrangement. It is, however, actually possible in an embodiment according to the invention that the armature 9 is guided out of the interior of the coil 27 and the use of a separate armature rod 10 is not necessary, and the bolt 11 is carried directly by the armature 9. The invention comprises also an embodiment where the bolt 11 is designed in one piece with the armature rod 10 or the armature 9, that means the bolt 11 forms only a functional section of the armature 9 or the armature rod 10, or the bolt 11 is provided as discrete, separately manufactured element put up in a suitable assembly step on the armature 9 or the armature rod 10. The latter is advantageous as the return spring 29 is supported, on the one hand, outside the solenoid 4 on the side of the yoke 30 opposite the solenoid 4, and, on the other hand, on the contact surface 32 of the bolt 11 facing the solenoid 4. Mounting is performed here in such a way that the finished component solenoid 4 having the armature rod 10 is guided through the bore hole of the yoke 30, on which then the return spring 29 can be put, and then the bolt 11 is put eventually on the armature rod 10 and fixed in axial direction, for example caulked.

In the example shown here the locking unit 1 according to the invention has several catch assemblies 6. For example, in the direction of circumference around the armature rod 10 three catch assemblies 6 are arranged, preferably a concentric arrangement being provided for an even load. In the direction of circumference, the single catch assemblies each time are arranged equidistantly, and therefore ideally all loaded evenly.

The catch assembly 6 is defined in axial direction (which is parallel to the direction of movement 3 of the piston 2 or the direction of movement 33 of the armature 9), however, it is supported on bearings swiveling or folding at the carrier 22, and thus radially moving. The carrier 22 is in the example shown here a part of the yoke 30. The catch assembly 6 extends here in axial direction and is clearly longitudinal. With respect to the interior diameter of the housing 23, that accommodates the catch assembly 6, the catch assembly 6 is longer than the interior diameter, preferably at least 1.5 or 2 interior diameters of the housing 23.

The catch assembly 6 shown in FIGS. 1a, 1b of the locking unit 1 according to the invention is formed by a spring section 7 and a latch section 8.

The spring section 7 joins the support section 34. The catch assembly 6 is connected at the support section 34 with the carrier 22. At the end of the catch assembly 6 opposite the support section 34 the latch section 8 is located.

In the embodiment shown here the catch assembly 6 is configured multi-piece, in particular two-piece. The spring section 7 is here realized in a separate component, the spring part 19. The latch section 8 is also formed by a separate component, the latch part 18. In particular, in a two-piece configuration of the catch assembly 6, a spatial overlapping of spring section 7 and latch section 8 is possible, as the single components, the latch part 18 and the spring part 19, extend in axial direction in identical sections. This does not contradict the invention, as the functional section, spring section 7 and latch section 8, respectively, each time are realized by separate components adapted perfectly to their respective function. In a one-piece embodiment, these sections may, however, also overlap, at least partly.

The function of the spring part 19 is to impress sufficient preload to the catch assembly 6 such that the catch assembly 6 wants to swivel towards the piston 2 or the piston head 5. This is accomplished by appropriate elasticity of the spring section 7 or the spring part 19. The spring part 19 is formed, for example, as a discrete spring, for example of spring wire or as resilient component of spring steel or the like. The support section 34 serves eventually as support or rotating point for the catch assembly 6. The catch assembly 6 is preloaded towards the piston head 5. This angling movement resulting from the spring section 7 or the spring part 19 is indicated by the arrow 35; this is a swiveling movement around the support area 34. Because of the preload resulting from the use of the spring section 7 or the spring part 19, the catch assembly 6 rests on the bolt 11. The catch assembly 6 has here a cam 20 sliding along on the surface area of the bolt 11 corresponding with the axial position of the bolt 11. In sections with larger diameter, the bolt 11 causes pushing-out, that is a radial outwards movement of the catch assembly 6, the latch section 8 provided at the catch assembly 6 is removed radially from the piston head 5.

The term radially refers here to the axial direction defined by the direction of movement 3 of the piston or the direction of movement 33 of the armature 9 that is parallel to it.

The active diameter of the cone-like bolt 11 that is in operative connection with the cam 20 depends on the axial position of the armature rod 10. The bolt 11 is connected fixedly with the armature rod 10, the armature rod 10, on the other hand, is connected fixedly with the armature 9. Thus, the axial position of the bolt 11 depends on the axial position of the armature 9 in the solenoid 4; now, when the coil 27 is not flown through by current, as shown in FIG. 1a, the return spring 29 pushes the arrangement of armature 9, armature rod 10, and bolt 11 to the left, and thus the catch assembly outwards.

In the position shown in FIG. 1b, the coil 27 is flown through by current so that the armature 9 is shifted to the right, so that also the bolt 11 slides to the right. The cam 20 slides along the front end of the bolt 11 where this shows a smaller diameter. Because of the preload impressed in the catch assembly 6, the retreated bolt 11 does not prevent anymore the catch assembly 6 from swiveling in, the latch section 8 then comes in the active area with the piston head 5.

The arrangement is here chosen such that the support section 34 of the catch assembly 6 is supported on bearings at the carrier 22, that is part of the yoke 30, movably, in particular swiveling, at least bending flexibly or elastically, so that the latch section 8 can be angled against the piston 2 or the piston head 5 in a swiveling movement that is rectangular, acute or radial with respect to the direction of movement of the piston 2.

The piston 2, in particular the piston head 5 of the piston 2, has an undercut, a shoulder, collar, ring, protrusion, or retaining collar 36 interacting with the elements of the latch section 8 at least force-fittingly or even form-fittingly.

In the one-piece as well as in the two-piece or multi-piece configuration of the catch assembly 6, the latch section 8 or the latch part 18 is formed by a longitudinally extending latch carrier 14 and a latch element 13 sticking out rectangularly or angularly at the latch carrier 14, in particular towards the piston 2. The latch element 13 is here, for example, formed by a hook, latch, protrusion, shoulder, catch or the like. The reinforcement 12 provided according to the invention preferably is located in the latch section 8. In the embodiment shown in FIGS. 1 a, b, the reinforcement 12 is realized, in particular in the two-piece configuration of the catch assembly 6, where the latch part 18 has a considerably higher tensile strength than the spring part 19, wherein the latch part 18 has a clearly lower spring inclination than the spring part 19. By dividing the functions latching and springing in the two separate discrete components spring part 19 and latch part 18, it is possible in a simple way to realize the reinforcement 12 in a reinforced configuration of the latch part 18 by an accordingly sturdier design of the latch part 18.

The way of function of the locking unit 1 according to the invention is as follows.

In the unlocked position shown in FIG. 1a, the locking unit 1 is neither engaged in the piston 2 nor the piston head 5. In the unlocking position shown with reference to the locking unit 1 rather the blocking element 26 arranged at the piston 2 on the side opposite the piston head 5 is in corresponding engagement in the transmission train of the vehicle, when, for example, the locking unit 1 according to the invention is employed as parking lock. For example, the parking lock is active when the vehicle is parked, the engine turned off, the hydraulic cycle of the automatic gear is not under pressure. As no electric consumer is supposed to be active in this position or active in order to save energy, the windings of the coil 27 are not flown through by current, either, therefore no magnetic field is active at the solenoid 4. Thus, only the return spring 29 works. Therefore, the bolt 11 is shifted to the right such that the bolt pushes the cams 20 of the catch assembly 6 radially outwards, and defines the unlocking position in that the latch section 8 is not in engagement with the piston head 5. The piston 2 is shifted to the left by the rest pressure in the interior of the housing.

In the driving position of the vehicle, the blocking element 26 has to be removed from the transmission train. This is accomplished by an appropriate pressurizing of the pressure space 25, for example, with the pressure of the system of the hydraulic cycle of the automatic gear through which the piston 2 is pushed in the housing 23 or the piston rod 37 carrying the blocking element 26 immerses in the housing. In this driving position now the position of the piston has to be secured to make sure that the blocking element 26 does not get in the transmission train unintendedly. This is accomplished by the locking position of the locking unit 1 shown in FIG. 1b, where the windings of the coil 27 are flown through by current so that a magnetic field occurs shifting the armature 9 against the force of the return spring 29 to the right for bridging the air gap 28, and thus shifting the bolt 11 axially to bring it out of engagement from the cam 20 of the catch assembly 6. The preload impressed in the catch assembly 6 by the spring section 7 or the spring part 19 swivels or folds the entire catch assembly 6 inwards, so that the latch section 8, in particular the latch element 13 provided at the latch carrier 14, gets in the undercut or retaining collar at the piston head 5, and thus defines the axial position of the piston head 5 and thus also of the piston 2. Possible pressure fluctuations in the hydraulic cycle of the automatic gear are then not decisive for the position of the piston 2; as long as the coil 27 is flown through by current, it is guaranteed that the blocking element 26 does not engage in the gear output.

FIGS. 2a, 2b show the same construction of the locking unit 1 according to the invention as FIGS. 1a, 1b. However, the configuration of the catch assembly 6 differs, so that here this feature will be discussed in detail. In FIGS. 1a, 1b the two-piece catch assembly 6 is formed of a latch part 18 made from rather sturdy or thick material, and a spring part 19 that can be realized, for example, as spiral spring or of spring wire. The cam 20 of the catch assembly 6 supported on the bolt 11 is formed in FIGS. 1a, 1b by the sturdy latch part 18. In the embodiment shown in FIGS. 2a, 2b it is possible as an alternative that the cam 20 is realized also by the spring part 19, or is also formed by the latch part 18.

Again the catch assembly 6 is configured in two parts, the latch section 8 formed by the separate latch part 18 having a reinforcement 12 that consists, for example in a suitably chosen material and/or other constructive modifications. Basically, it is possible to effect the reinforcement 12 by an appropriate material of the latch part 18 that is harder and more resistant in order to resist durably the permanent hits of the piston 2 on the latch element 13, and thus to increase the lifetime of the locking unit according to the invention.

In FIGS. 1a, 1b the latch part 18 is configured, for example, as forged or cast element, so that an accordingly larger thickness of material can be realized. However, it is also possible to manufacture this latch part from drawn or rolled material.

In the embodiment according to FIGS. 2a, 2b the latch part is formed of strip stock or flat material that has also been formed in a forming step, preferably cold. When the functions of the spring section 7 and the latch section 8 are disengaged into two separate components, the respective components can be perfected to their particular function. Thus, the spring part 19, also formed of strip stock or flat material, takes over the preload function in order to impress a force or turning moment resulting inwards, in the direction of the piston head 5 on the catch assembly 6, just as in FIGS. 1a, 1b. At the spring section 19 the catch assembly 6 is then also connected flexibly to the carrier 22 in the support section 34, a separate retaining ring or caulking or the like being provided for that.

FIGS. 3a, 3b and 4a, 4b, respectively, show two different embodiments of a two-piece catch assembly 6.

38 indicates the bottom area of the catch assembly 6 where the catch assembly 6 is connected to the carrier 22 in the support section 34. The bottom area 38 is here part of the spring part 19 of the two-piece catch assembly 6. For that, the bottom area 38 sticks out rectangularly from the longitudinally extending catch assembly 6, the angulation is arranged here on the same side as the latch element 13 at the catch assembly 6.

The two components, latch part 18 and spring part 19, are manufactured separately, and joined in a suitable way to form the catch assembly 6, wherein, for example, a soldering joint, a mechanic caulking, or another sufficiently stable connection between the two parts is provided.

The longitudinal extension of the latch part 18 is somewhat more, that means longer than the spring part 19. In the middle section, it forms the inwardly protruding cam 20, therefore the cam 20 is arranged on the same side as the angled bottom area 38 or the latch element 13.

As it can be seen in particular in the bottom view of FIG. 3b, the latch part 18 has on the end opposite the bottom area 38 a punching 39, on the side of which opposite in the bottom area 38 the latch element 13 sticks out from the longitudinally extending latch carrier 14. On the side facing the punching 39, the latch element 13 forms a retaining surface 15 interacting with the retaining collar, catch, protrusion or other retaining element of the piston head 5 at least force-fittingly, or even form-fittingly. Via the retaining surface 15, the retaining force is impressed from the catch assembly 6 in the piston 2 in the locking position. Preferably, also in this section, the latch section 8, a reinforcement 12 is located formed by an appropriate material strengthening or mechanic reinforcement.

FIG. 3c shows the latch part 18 as separate component that can be manufactured separately.

The punching 39 has here laterally besides the bent latch element 13 recesses 40 serving also for reinforcement, that means they prevent a notch effect between the bent latch element 13 and the latch carrier 14.

When comparing FIG. 3c with FIG. 4c, the difference shows between these two modifications of the embodiment of the catch assembly 6 according to the invention. In the modification according to FIGS. 4a, 4b, 4c, a spring element 21 acting axially or in the direction of movement 3 of the piston 2 is provided between the cam 20 and the bottom area 38. Alternatively, this spring element 21 can also be employed as reinforcement 12 according to the invention as it has shock absorbing and thus reinforcing functions. The configuration of the spring element 21 is realized by a meandering structure or punching 39 in the flat material of the latch part 18. Preferably, here the material of the latch part 18 is spring steel or the like.

In order to improve the spring qualities of the spring part 19, the spring part 19 tapers in the middle section 41 trapezoidally, and has a punching 42 in the middle extending longitudinally. This geometric configuration supports the resilient qualities accordingly. The middle section 41 is here provided between the cam 20 and the bottom area 38.

FIGS. 5a, 5b show an essentially one-piece configuration of the catch assembly 6. The catch assembly 6 is divided here in the spring section 7 and the latch section 8, the spring section 7 joining in particular the bottom area 38 and having a trapezoid middle section 41, similar to the one in FIG. 3b or FIG. 4b. The punching 42 is provided in the same way. The spring section 7 extends here between the cam 20 and the bottom area 38.

The latch section 8 joins in one piece the spring section 7 on the side opposite the bottom area 38. The reinforcement 12 is located here on the side of the latch element 13 opposite the retaining surface 15. The reinforcement 12 is formed in the embodiment shown here by a folding 16 of the material of the catch assembly 6.

The material of the catch assembly 6, designed here in one piece, for example, consists of a spring steel provided as flat material or strip stock with a thickness of 0.5 mm, 0.7 mm, 0.9 mm, or 1 mm. It is also possible, to realize the spring part 19 or the latch part 18 in a two- or more piece design of the catch assembly 6 from comparable material. Cleverly, then for increasing the strength of the latch part, the material thickness of the latch part is increased for forming the reinforcement 12.

FIGS. 6a, 6b show another modification of a one-piece catch assembly 6 that is very similar to the construction of the example of FIGS. 5a, 5b. In the embodiment shown here, the reinforcement 12 is formed by a support 17 joining on the side of the latch element 13 opposite the retaining surface 15. The support 17 is here designed as so-called separate support element and inserted in the back of the latch element 13. A stable attachment is accomplished, for example, by caulking, that is a mechanic connection, or by gluing in, welding in or soldering.

Although the invention has been described in terms of specific embodiments which are set forth in considerable detail, it should be understood that this is by way of illustration only, and that the invention is not necessarily limited thereto, since alternative embodiments and operating techniques will be become apparent to those skilled in the art in view of the closure. Accordingly, modifications are contemplated which can be made without departing from the spirit of the described invention.

What is claimed is:

1. A locking unit for locking the movement of a piston that drivable by a drive, wherein the locking unit comprises:
    a solenoid; and
    a two-piece catch assembly comprising a first piece comprising a spring section and a second piece comprising a latch section, the spring section and the latch section overlapping in an axial direction, the spring section provided at a spring part and the latch section provided at a latch part, the spring part and latch part, respectively interacting within the catch assembly, wherein the spring section angles the catch assembly against an armature or an armature rod of the solenoid or against a bolt held by the armature or the armature rod such that in a locking position the latch section blocks the movement of the piston,
    wherein in an unlocking position the movement of the piston is released,
    wherein the latch section comprises a reinforcement configured to allow the latch section to provide an axial force on the piston in the direction of movement of the piston while in the locking position.

2. The locking unit according to claim 1, wherein the reinforcement is formed by exposing the reinforcement to a heat treatment, thereby resulting in an increased specific strength of the reinforcement as compared to a remaining portion of the latch section.

3. The locking unit according to claim 1, wherein the reinforcement is formed by exposing the reinforcement to a heat treatment, thereby resulting in an at least 4% increase in specific strength of the reinforcement as compared to a remaining portion of the latch section.

4. The locking unit according to claim 1, wherein the entire catch assembly is formed of spring steel that can be cold-formed.

5. The locking unit according to claim 1, wherein material forming the latch section is provided, and the reinforcement is formed by increasing a thickness of a material forming the latch section.

6. The locking unit according to claim 1, wherein the latch section is at least formed by a latch element and a latch carrier, wherein the latch element sticks out (a) rectangularly at the latch carrier or (b) angularly at the latch carrier.

7. The locking unit according to claim 6, wherein the latch element sticks out at the latch carrier towards the piston, and the latch element includes a retaining surface interacting with the piston in the locking position, and the reinforcement is located at the latch section on the side of the latch element opposite the retaining surface.

8. The locking unit according to claim 1, wherein the catch assembly is supported on bearings on a carrier movably.

9. The locking unit according to claim 1, wherein the latch section is formed at least of a latch element and a latch carrier, wherein the latch element sticks out rectangularly or angularly at the latch carrier.

10. The locking element according to claim 1, wherein the latch section is formed at least of a latch element and a latch carrier, wherein the latch element sticks out rectangularly or angularly at the latch carrier towards the piston, with either of (a) the latch element having a retaining surface interacting in the locking position with the piston, and the reinforcement being located at the latch section on the side of the latch element opposite the retaining surface, and wherein the latch element is formed of a hook, a latch, a protrusion or a shoulder, or (b) the latch element having a retaining surface interacting with the piston in the locking position, and the reinforcement being located at the latch section on the side of the latch element opposite the retaining surface, and wherein the piston has a shoulder, collar, ring, protrusion or retaining collar interacting with the latch section or the latch element.

11. The locking unit according to claim 1 wherein the latch section is formed at least of a latch element and a latch carrier, wherein the latch element sticks out rectangularly or angularly at the latch carrier towards the piston, with the latch element having a retaining surface interacting in the locking position with the piston, and the reinforcement being located at the latch section on the side of the latch element opposite the retaining surface, and wherein the locking unit has a housing in which the latch carrier is housed stationarily with respect to the housing and the catch assembly.

12. The locking unit according to claim 1, wherein the reinforcement is formed as a folding.

13. The locking unit according to claim 1, wherein the spring part is formed of (a) a well resilient material or (b) spring steel that can be cold-formed.

14. The locking unit according to claim 13, wherein the material of the latch part exhibits a higher strength with respect to tensile load than the material of the spring part.

15. The locking unit according to claim 1, wherein the latch part or the catch assembly has a spring element acting as reinforcement in the direction of movement of the piston.

16. The locking unit according to claim 1 wherein the catch assembly is supported on bearings on a carrier swivelling, such that the latch section can be angled against the piston in a rectangular or acute direction with respect to the direction of movement of the piston.

17. The locking unit according to claim 1, wherein the reinforcement is formed as (a) a terminal material folding of a latch carrier or (b) as a separately inserted support.

18. The locking unit according to claim 1, wherein the latch part is disposed radially inward with respect to the spring part.

* * * * *